(12) United States Patent
Dong et al.

(10) Patent No.: US 12,041,024 B1
(45) Date of Patent: Jul. 16, 2024

(54) BUILDING AND UPDATING RELATIONSHIP GRAPH BASED ON ONLINE CHAT COMMUNICATION GROUPS

(71) Applicant: Zoom Video Communications, Inc., San Jose, CA (US)

(72) Inventors: Qiumin Dong, Suzhou (CN); Jiyue Ma, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/379,220

(22) Filed: Oct. 12, 2023

(51) Int. Cl.
*H04L 51/52* (2022.01)
*H04L 51/043* (2022.01)

(52) U.S. Cl.
CPC ............ *H04L 51/52* (2022.05); *H04L 51/043* (2013.01)

(58) Field of Classification Search
CPC ............................ H04L 51/52; H04L 51/043
See application file for complete search history.

(56) References Cited

U.S. PATENT DOCUMENTS

| | | | |
|---|---|---|---|
| 2013/0294594 A1* | 11/2013 | Chervets | H04M 3/56 379/202.01 |
| 2016/0212377 A1* | 7/2016 | Griffin | H04L 65/403 |
| 2021/0233037 A1* | 7/2021 | Øhrn | H04L 12/1827 |
| 2022/0014571 A1* | 1/2022 | Polish | H04L 65/1093 |
| 2024/0064063 A1* | 2/2024 | Hall | G06F 18/22 |

* cited by examiner

Primary Examiner — Caroline H Jahnige
Assistant Examiner — Steven C Nguyen
(74) Attorney, Agent, or Firm — Kilpatrick Townsend & Stockton LLP

(57) ABSTRACT

Systems and methods for building and updating a relationship graph based on online chat communication groups are provided. In an example, a computing device receives chat communication group user information which includes user-group records each indicating a user and a chat communication group joined by the user. The computing device builds a relationship graph for chat communication groups based on the chat communication group user information with nodes representing respective users, an edge connecting two nodes indicating that two users are in at least one common chat group, and the weight of the edge representing the number of common chat communication groups that the two users belong to. The device further generates graph updates based on chat user change records describing user changes occurred during a time period and transmits the graph updates to a remote computing device for updating the relationship graph and identifying relationship among the users.

17 Claims, 7 Drawing Sheets

BUILDING AND UPDATING RELATIONSHIP GRAPH BASED ON ONLINE CHAT COMMUNICATION GROUPS

FIELD

The present application relates to systems and methods for building and updating a relationship graph among users based on online chat communication groups joined by the users.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
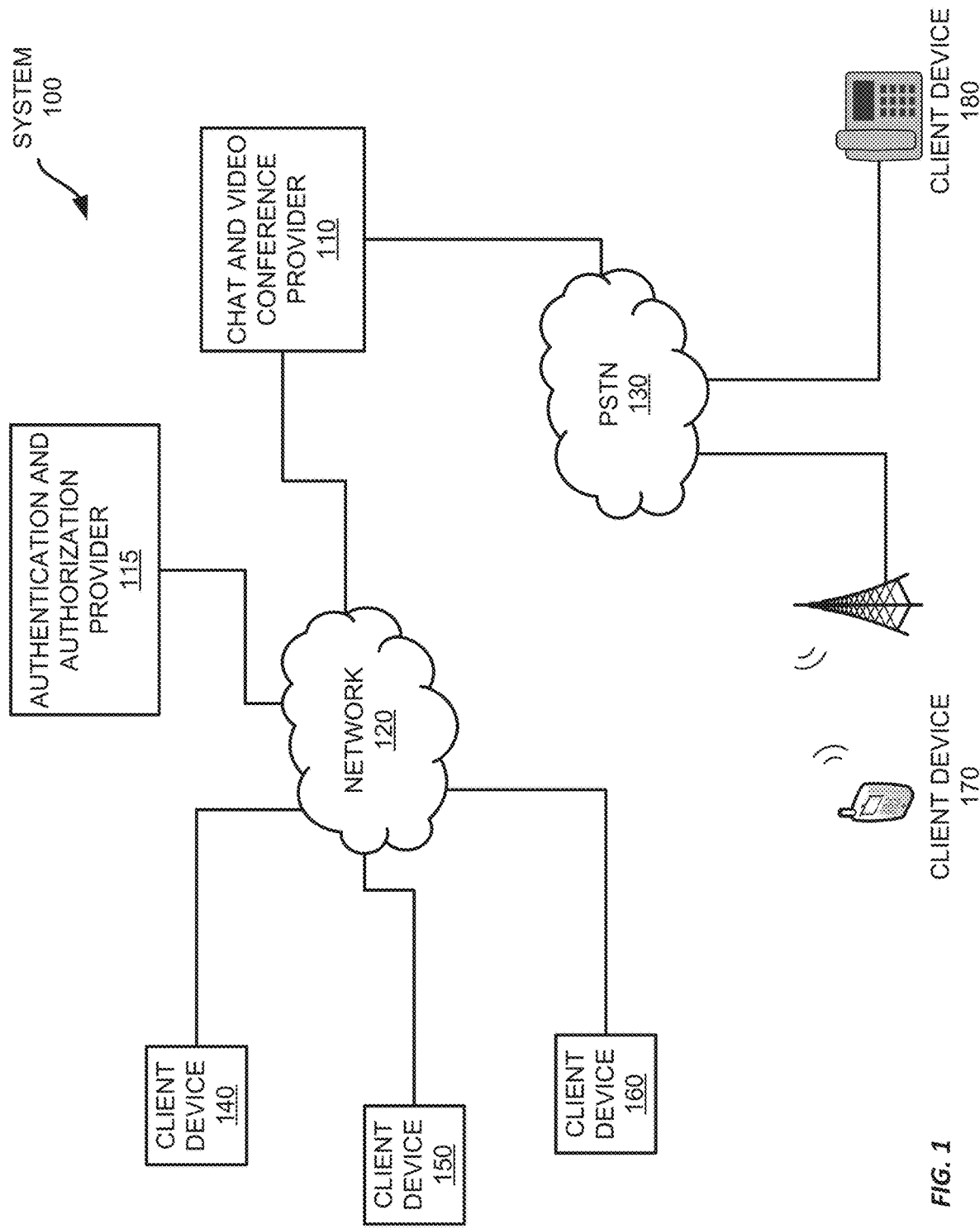
FIG. 1 shows an example system that provides chat and videoconferencing functionality to various client devices, according to certain aspects of the present disclosure.

Examples are described herein in the context of systems and methods for building and updating a relationship graph based on online chat communication groups. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

A graph is a useful tool to model relationships among entities, such as users. However, the data used to build a relationship graph, if not chosen carefully, may not accurately reflect the relationship among the entities, rendering the graph less useful. Existing approaches use a variety of data associated with the entities to build the relationship graph, such as the preferences of the entities, the content visited by the entities, locations of the entities, and so on. While a large amount of data may help to capture the relationship among the entities, data that are not reflective of the entity relationship can become noise in the generated relationship graph. In addition, processing a large amount of data can lead to high computational complexity. For a graph that is used to represent a large number of entities, such as tens of thousands of entities, generating and updating the graph can become computationally expensive. Transmitting such a large graph will also require a large amount of network bandwidth.

To solve the above problems associated with existing graph generation and updating mechanisms, example systems and methods for building and updating a relationship graph based on online chat communication groups are provided herein. Chat messaging has become a fixture of modern communication. In particular, chat messaging is used across numerous platforms, especially within work environments as a means of providing swift and easy communication between individuals. Chat messaging involves an application that allows multiple participants to exchange messages with other parties of the chat communication. Chat messaging may be carried out through mechanisms such as a one-on-one chat between two users, a group chat among two or more users, or a chat channel that is created for a specific topic and can be joined by users. These chat messaging mechanisms are collectively referred to herein as "chat communication groups" (or a "chat groups" in short). Parties in a chat communication group are also referred to herein as "users" or "members" of the chat communication group.

The different or common chat communication groups joined by the users can be an indication of the relationships among these users. For example, users who are in the same chat communication group built for a particular technical topic can indicate that the users in the group have common interest at least in this particular technical topic. If a pair of users are in multiple common chat groups, it is likely that the two users are similar to each other. The higher the number of common groups is, the more likely the two users are similar. As such, the user information of the chat communication groups can be utilized to generate a relationship graph.

As described herein, a relationship graph service can receive or otherwise access the chat communication group user information from a chat and video conference provider configured to establish chat communication groups for users. The chat communication group user information for a chat communication group indicates the users who have joined the chat communication group. Based on the chat communication group user information, the relationship graph service can build a relationship graph for multiple chat communication groups. The nodes of the relationship graph can represent respective users in the multiple chat communication groups. An edge of the graph connecting two nodes can indicate that two users represented by the two nodes are in at least one common chat communication group. The weight of the edge can represent the number of common chat communication groups that the two users belong to.

Constructing the relationship graph in this way allows the graph to be updated efficiently. For example, as the users of the multiple chat communication groups change, such as new users joining one or more of the chat communication groups and existing users leaving one or more chat communication groups, the user changes can be received by the relationship graph service. The relationship graph service can generate updates of the relationship graph based on the chat user change records to include only the changes to the graph. For example, the relationship graph service can determine a set of pairs of users whose relationship is to be updated in the relationship graph because at least one of each pair of users recently joined one or more chat communication groups. The relationship graph service can further determine a second set of pairs of users whose relationship is to be removed from the relationship graph because at least one of each pair of users left one or more chat communication groups.

The relationship graph service can aggregate the first set of pairs of users and the second set of pairs of users to generate a weight change for each pair of users in the first and second sets of pairs of users. The weight changes for the pairs of users can be transmitted to a remote computing device as the updates to the relationship graph. The remote computing device can use the relationship graph updates to update the relationship graph and identify relationships among the users from the updated relationship graph. In another example, the weight changes can be applied to the relationship graph to generate an updated relationship graph. The updates to the relationship graph can be generated by including the new weight of each edge in the relationship graph that has a non-zero aggregated weight change. The above process can be repeated periodically as the users in the chat communication groups change.

As described herein, certain embodiments provide improvements to relationship graph generation and update. These improvements include using concise data (e.g., the common chat communication groups among users) to build the relationship graph. As a result, the relationship graph can be built more efficiently using less computation power and less memory space. In addition, because of the mechanism of building the relationship graph, updating the graph can be performed faster and using less computational resources. For example, instead of evaluating each node and edge of the graph, only nodes that are, or are connected to, nodes whose corresponding users have changed chat communication group membership need to be evaluated and updated. These nodes typically constitute a small portion of the nodes in the graph, and thus the computational complexity of updating the graph is significantly reduced compared with evaluating the entire graph.

In addition, the relationship graph built and updated based on the online chat communication groups as described herein can be used in various technical fields to improve those technical fields. For example, the relationship graph built based on the online chat communication groups can be used in contact search, for example, to rank the search results. The ranking allows that most relevant users to be listed first thereby improving the search accuracy. Further, because building and updating the relationship graph involves less computational power and storage space, the graph can be built and updated quickly and more frequently so that the relationship graph is up to date, allowing the search results to be ranked accurately. For the same reason, the relationship graph may be, in some cases, loaded on individual computing devices where the search queries are submitted, thereby increasing the response speed of the search.

This illustrative example is given to introduce the reader to the general subject matter discussed herein and the disclosure is not limited to this example. The following sections describe various additional non-limiting examples and examples of systems and methods for building and updating a relationship graph based on online chat communication groups.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
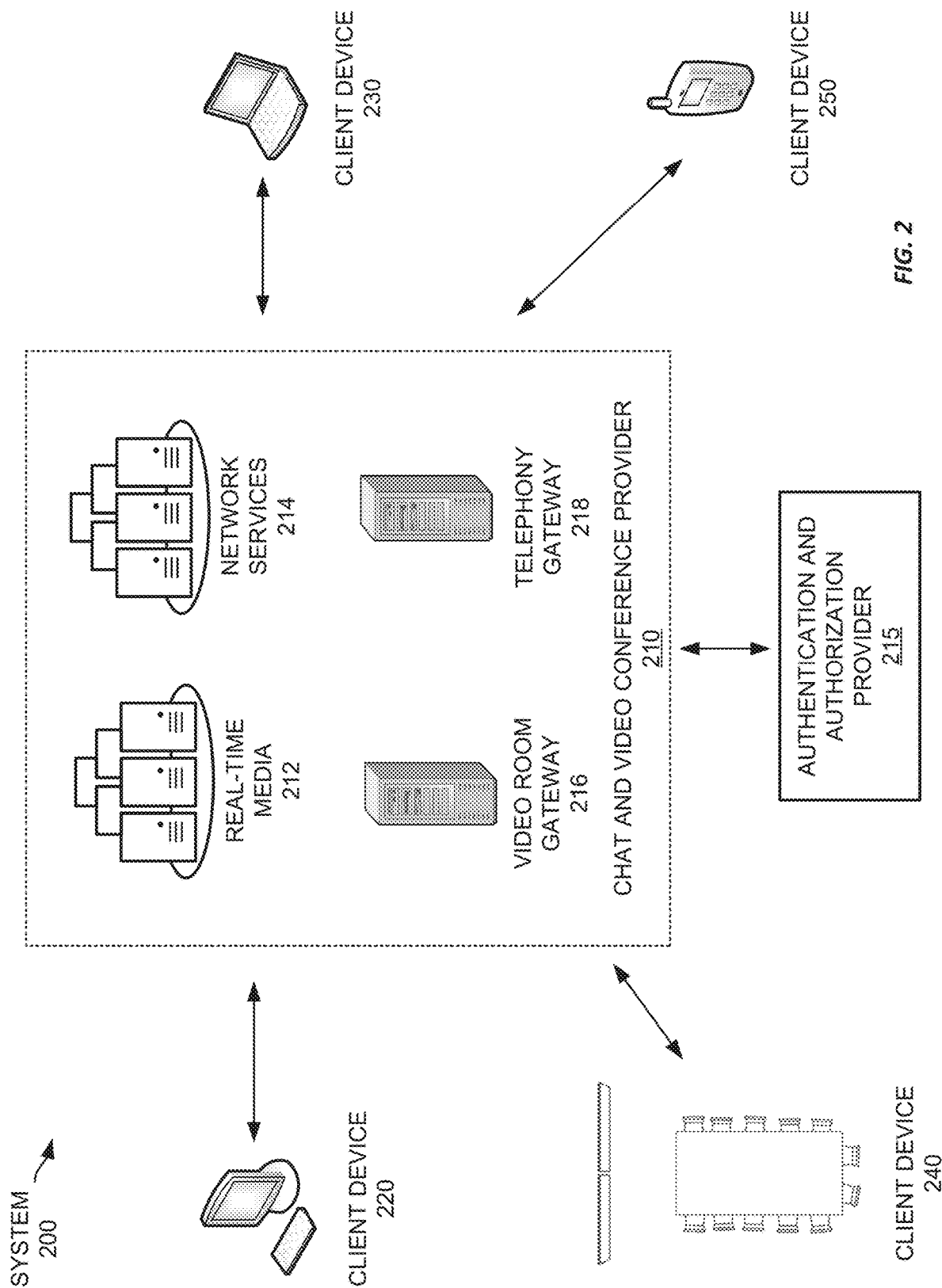
FIG. 2 shows an example system in which a chat and video conference provider provides chat and videoconferencing functionality to various client devices, according to certain aspects of the present disclosure.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers)

to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s)

216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality describe above, the chat and video conference provider 210 (or the chat and video conference provider 110) may provide a chat functionality, such as through one or more chat management servers (not shown in FIG. 2). The chat management servers may be the same servers as the real-time media servers (that is, the real-time media servers implementing the functionality of the chat management) or separate servers. In such examples, the chat and video conference provider 210 may allow a user to create one or more chat communication groups where the user may exchange messages with other users that have access to the chat communication groups. The messages may include text, image files, video files, or other files. In some examples, a chat communication group may be "open," meaning that any user may access the chat channel. In other examples, the chat communication group may require that a user be granted permission to access the chat communication group. The chat and video conference provider 210 may provide permission to a user and/or a host of the chat communication group may provide permission to the user. Furthermore, there may be any number of members permitted in the chat communication group.

Similar to the formation of a meeting, a chat communication group may be provided by the chat management servers where messages exchanged between members of the chat communication group are received and then directed to respective client devices. For example, if the client devices 220-250 are part of the same chat communication group, messages may be exchanged between the client devices 220-240 via the chat and video conference provider 210 in a manner similar to how a meeting is hosted by the chat and video conference provider 210.

Figure 3:
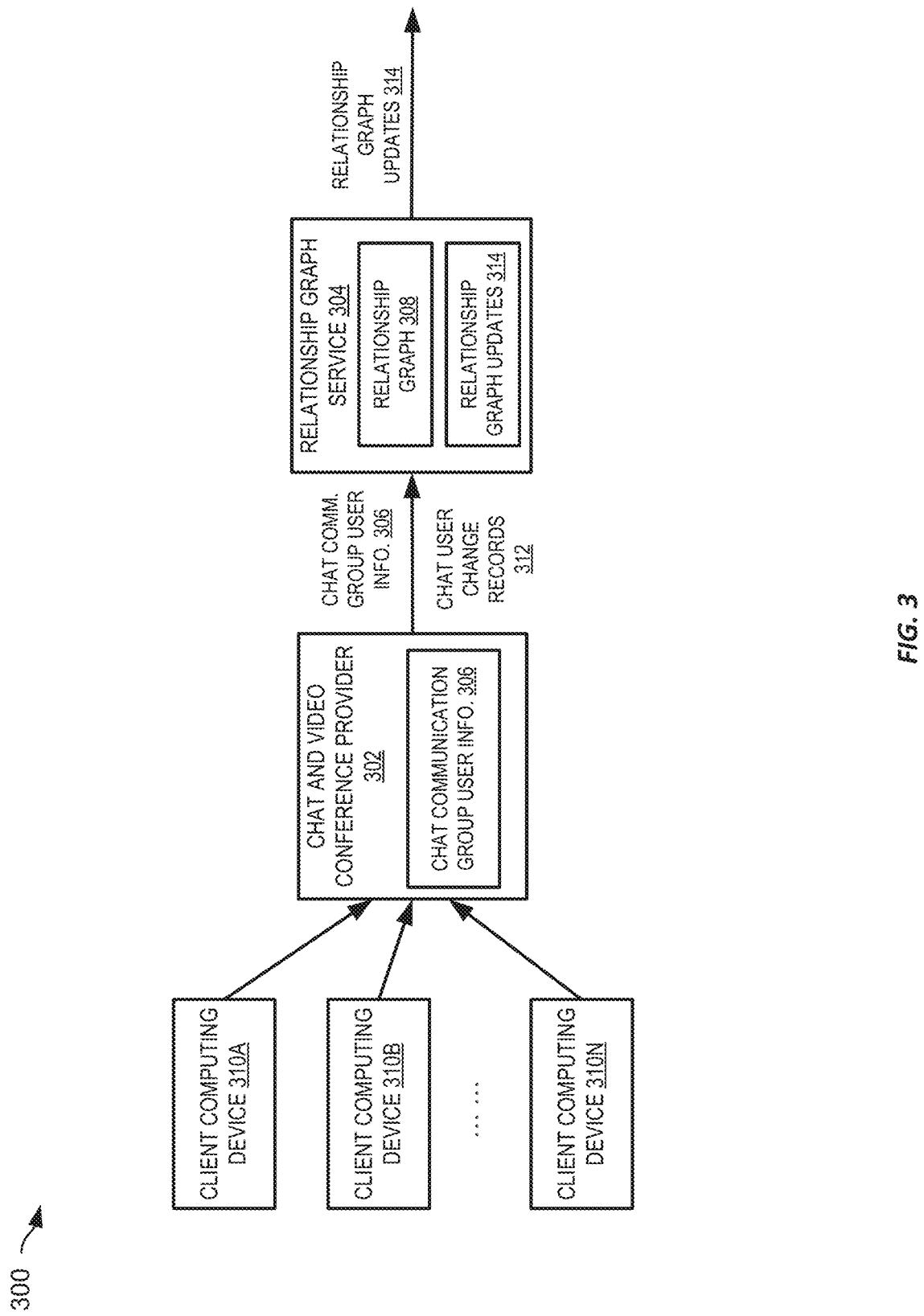
FIG. 3 illustrates an example of an operating environment for building and updating a relationship graph based on online chat communication groups, according to certain aspects of the present disclosure.

Referring now to FIG. 3, FIG. 3 shows an example of an operating environment 300 for building and updating a relationship graph based on online chat communication groups, according to certain aspects of the present disclosure. The operating environment 300 includes a chat and video conference provider 302 configured to host and provide various functionalities of chat communication groups and video conferences. The operating environment 300 also includes a relationship graph service 304 configured to generate and update a relationship graph 308.

The chat and video conference provider 302 can be the chat and video conference provider 110 and the chat and video conference provider 210 described above with respect to FIGS. 1 and 2, respectively. The chat and video conference provider 110 allows users to start various chat communications to exchange chat messages, including sharing text messages, documents, images, video clips, audio clips, etc. The chat communications can be performed through a one-on-one chat between two users, a private group chat among multiple users, or a chat channel. Chat channels allow private or public groups to be created where a member can send messages, files, images, and start an instant meeting with channel members. These channels generally serve as longer-term collaboration forums, such as specific teams, channels serving a specific purpose or topic (Ask IT, for example), and announcement channels. In some examples, a chat channel can be a private chat channel or a public chat channel. Private channels cannot be searched for and found by users who are not already a member of the channel; current members of the channel can add those other members to give them access. Public channels can be made searchable and joinable by all members of an organization, and all members of the organization need no special invitation to join, but they can be added to the channel by current members as well.

For each chat communication group, the chat and video conference provider 302 receives and delivers chat messages to client computing devices 310A-310N associated with the respective users (which may be referred to herein individually as a client computing device 310 or collectively as the client computing devices 310). The chat and video conference provider 302 also manages the users of the chat communication groups. The chat and video conference provider 302 can maintain chat communication group user information 306 indicating the users in each chat communication group. For example, the chat communication group user information 306 can include user-group records each being formulated as $(g_i, u_j)$ indicating user $u_j$ is in chat communication group $g_i$. Here, $u_j$ is a user label uniquely representing user j within the chat and video conference system. $g_i$ is a chat group label uniquely representing the chat communication group i. The chat and video conference provider 302 can send the chat communication group user information 306 to the relationship graph service 304 where a relationship graph 308 can be generated. For example, the nodes of the relationship graph can represent respective users in the chat communication groups. An edge of the graph connecting two nodes can indicate that two users represented by the two nodes are in at least one common chat communication group. The weight of the edge can represent the number of common chat communication groups that the two users belong to. The relationship graph 308 can be transmitted to one or more remote computing devices (not shown in FIG. 3) for use in determining relationships among the users.

When the users of the chat communication groups change (e.g., users leaving or joining chat groups), the chat and video conference provider 302 can update the chat communication group user information 306 to reflect the user changes. For example, if a new user joins a chat communication group, the chat and video conference provider 302 can add a new record to indicate the relationship between the user and the chat group. In addition, the chat and video conference provider 302 can also create a record of the joining event, including an identifier of the chat group joined by the user, a user label used to uniquely represent the user within the system, the time and date of the joining event, and so on. Likewise, if a user leaves a chat communication group, the chat and video conference provider 302 can remove the corresponding user-group record from the chat communication group user information 306. In addition, the chat and video conference provider 302 can also create a record of the leaving event by including information such as an identifier of the chat group left by the user, a user label used to uniquely represent the user within the system, the time and date of the leaving event, and so on. These joining and leaving records can be kept by the chat and video conference provider 302 as the chat user change records 312. These chat user change records 312 can be sent to the relationship graph service 304, instead of the updated chat communication group user information 306, to facilitate the update of the relationship graph 308.

Based on the chat user change records 312, the relationship graph service 304 can generate the updates 314 of the relationship graph to include only the changes to the relationship graph 308. For example, the relationship graph service 304 can determine a set of pairs of users whose relationship is to be updated in the relationship graph 308 because at least one of each pair of users recently joined one or more chat communication groups. The relationship graph service 304 can further determine a second set of pairs of users whose relationship is to be removed from the relationship graph 308 because at least one of each pair of users left one or more chat communication groups. The relationship graph service 304 can aggregate the first set of pairs of users and the second set of pairs of users to generate a weight change for each pair of users in the first and second sets of pairs of users. The weight changes for the pairs of users can be transmitted to the one or more remote computing devices as the relationship graph updates 314. The one or more remote computing devices can use the relationship graph updates to update the relationship graph and update the relationships among the users identified from the updated relationship graph. In another example, the weight changes can be applied to the relationship graph to generate an updated relationship graph 308. The updates to the relationship graph 308 can be generated by including the new weight of each edge in the relationship graph that has a non-zero aggregated weight change. Additional details regarding generating and updating the relationship graph 308 will be provided below with respect to FIGS. 4-6.

Figure 4:
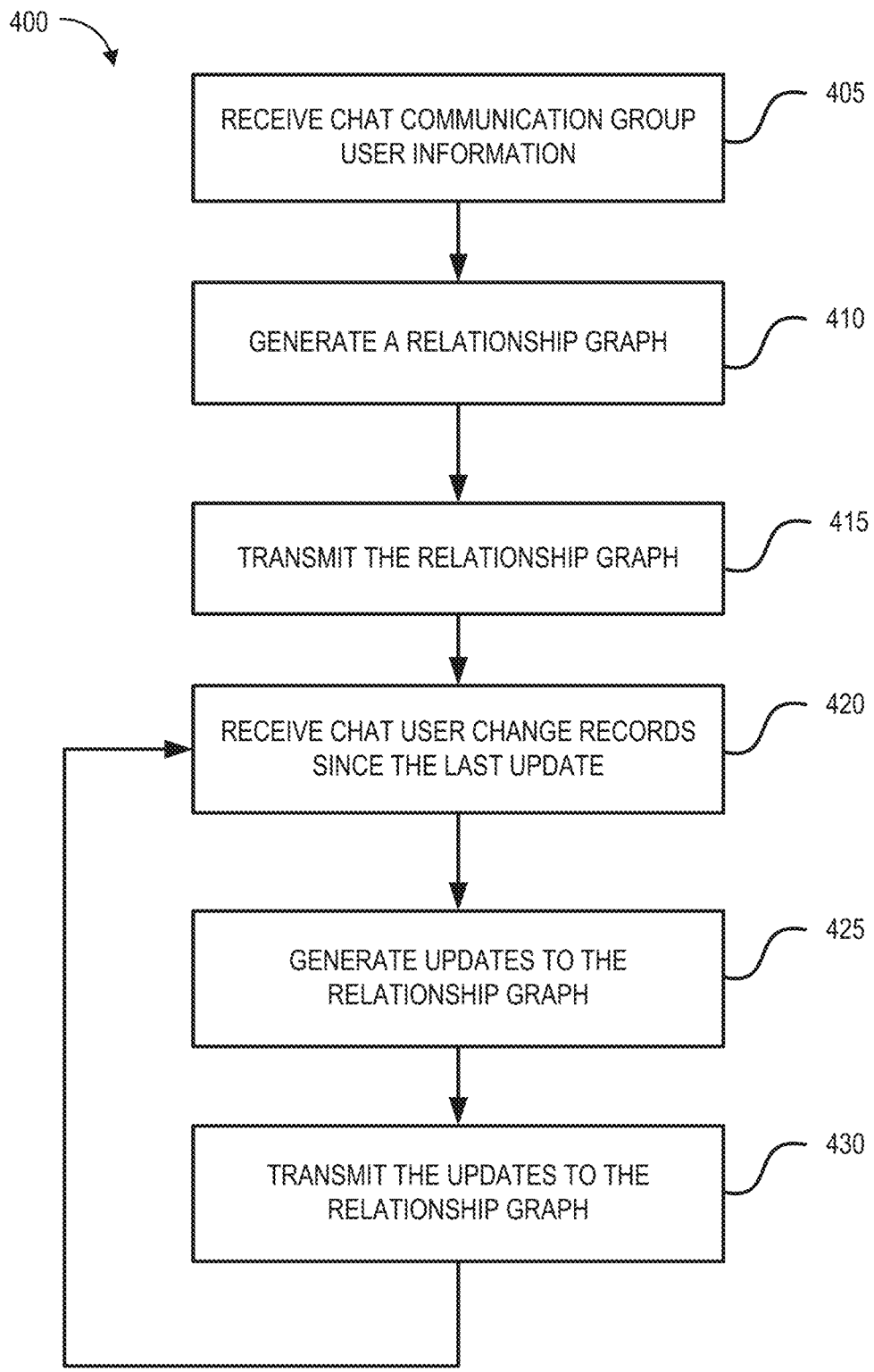
FIG. 4 shows a flowchart of an example process for building and updating a relationship graph based on online chat communication groups, according to certain aspects of the present disclosure.

Referring now to FIG. 4, FIG. 4 shows a flowchart of an example process 400 for building and updating a relationship graph based on online chat communication groups, according to certain aspects of the present disclosure. One or more computing devices (e.g., the relationship graph service 304) implement operations depicted in FIG. 4 by executing suitable program code. For illustrative purposes, the process 400 is described with reference to certain examples depicted in the figures. Other implementations, however, are possible. FIG. 4 will be described in conjunction with FIGS. 5 and 6.

Figure 5:
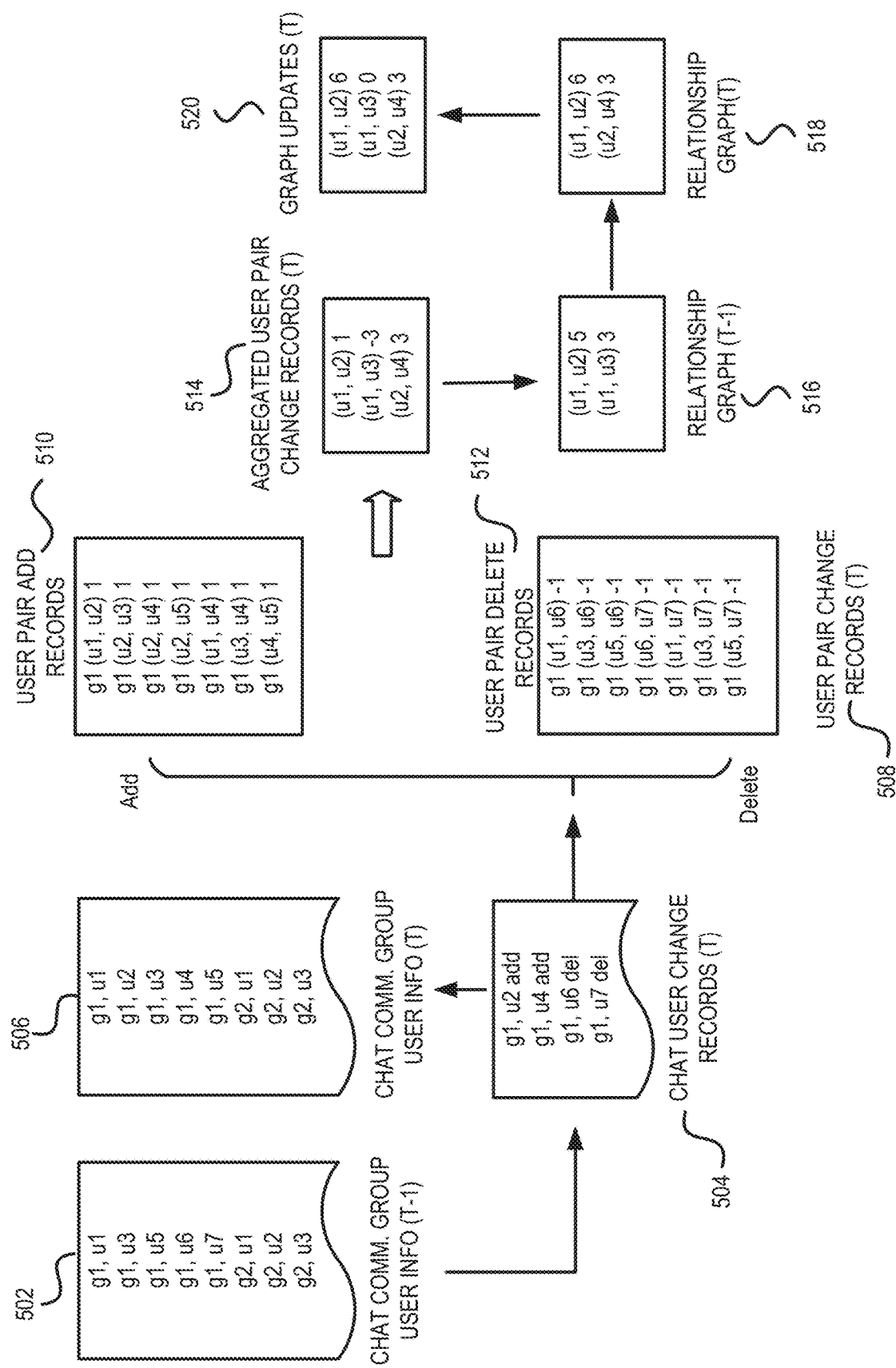
FIG. 5 illustrates an example of updating a relationship graph based on online chat communication groups, according to certain aspects of the present disclosure.

At block 405, the process 400 involves receiving chat communication group user information 306 from the chat and video conference provider 302. As discussed above, the chat communication group user information 306 indicates the users who have joined the chat communication groups. The chat communication group user information 306 can include user-group records each being formulated as $(g_i, u_j)$ indicating user $u_j$ is in chat communication group $g_i$. FIG. 5 shows an example chat communication group user information 502 at time T−1. As illustrated in FIG. 5, users u1, u3, u5, and u7 are in chat group 1 and users u1, u2, and u3 are in chat group 2 at time T−1.

In some examples, the chat communication group user information 306 received by the relationship graph service 304 includes the user-group records for all the chat communication groups. In other examples, the chat communication group user information 306 received by the relationship graph service 304 only includes the user-group records for private chat communication groups, such as the private group chat and the private chat channels.

Figure 6:
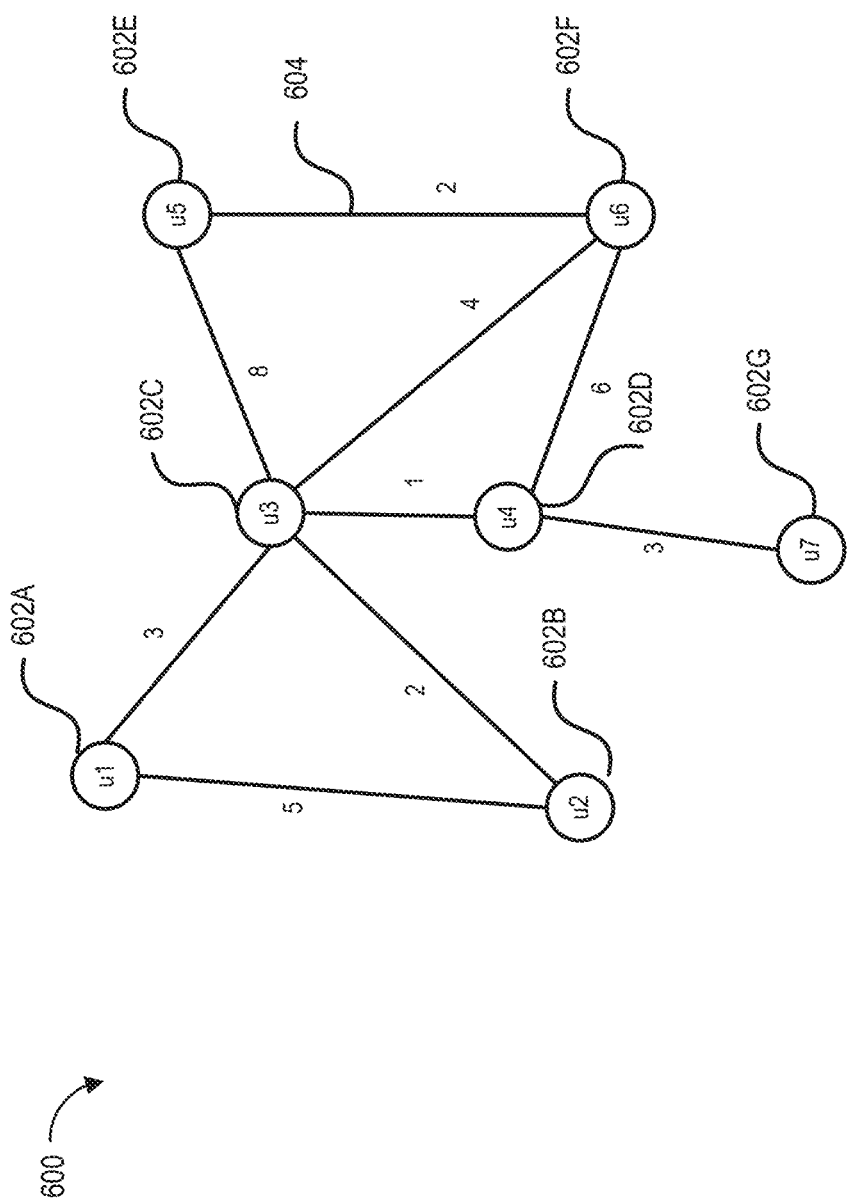
FIG. 6 illustrates an example of a relationship graph built based on online chat communication groups, according to certain aspects of the present disclosure.

At block 410, the process 400 involves generating a relationship graph 308 based on the chat communication group user information 306. FIG. 6 illustrates an example of a relationship graph 600 built based on chat communication group user information, according to certain aspects of the present disclosure. The relationship group 600 includes multiple nodes 602A-602G (which may be referred to herein individually as a node 602 or collectively as the nodes 602). Each node 602 represents a user $u_i$. For example, user $u_1$ is represented by node 602A and user $u_2$ is represented by node 602B, and so on. The relationship group 600 also includes edges 604 connecting these nodes 602. If two users have at least one common chat group, an edge 604 is included in the relationship group 600 to connect the two nodes corresponding to the two users. Further, each edge 604 has a weight. In some examples, the weight of an edge is determined as the number of common chat communication groups of the two users represented by the two nodes connected by the edge. For example, the edge connecting node 602A (representing user $u_1$) and node 602B (representing user $u_2$) has a weight of 5 because user $u_1$ and user $u_2$ have 5 common chat communication groups. In other words, 5 chat communication groups have both users $u_1$ and $u_2$ while other communication groups have either user $u_1$ or user $u_2$.

In some implementations, the relationship graph 308 is constructed using the chat communication group user information 306 for private chat communication groups such as the private group chat and/or the private chat channels. This is because anyone can join a public chat communication group and the relationship among users in the public chat group is not an accurate indication of the relationship among these users. In examples where the chat and video conference provider 302 sends the chat communication group user information 306 for all the chat communication groups, the relationship graph service 304 can select the chat communication group user information 306 for the private chat communication groups to construct the relationship graph 308.

Referring back to FIG. 4, at block 415, the process 400 involves transmitting the relationship graph 308 to a remote computing device for use in identifying relationships among the users. At block 420, the process 400 involves receiving the chat user change records 312 to update the relationship graph 308. In some examples, the relationship graph 308 is updated periodically, such as every week or every month. In these examples, the chat user change records 312 received at block 415 indicate the changes during the past time period. FIG. 5 shows example chat user change records 504 for the current time T. These chat user change records 504 reflect the changes occurred during the past time period from time T−1 to time T. Each record in the chat user change records 504 includes a group label where a user change occurred, a user label indicating the user involved in the change, and a type of the change, such as user join (indicated as "add") or user leave (indicated as "del"). For example, the chat user change records 504 include a record "g1, u2 add" indicating that user $u_2$ joined the chat group $g_1$ and a record "g1, u6 del" indicating user $u_6$ left the chat group $g_1$ in the past time period.

At block 425, the process 400 involves generating updates 314 to the relationship graph 308. The relationship graph service 304 can generate the updates 314 of the relationship graph based on the chat user change records 312 to include only the changes to the graph. For example, the relationship graph service 304 can determine a set of pairs of users whose relationship is to be updated in the relationship graph because at least one of each pair of users recently joined one or more chat communication groups. The relationship graph service can further determine a second set of pairs of users whose relationship is to be removed from the relationship graph because at least one of each pair of users left one or more chat communication groups. The relationship graph service 304 can aggregate the first and second sets of pairs of users to generate a weight change for each pair of users in the first and second sets of pairs of users. The weight changes for the pairs of users can be included as the updates 314 to the relationship graph. In another example, the weight changes can be applied to the current relationship graph 308 to generate an updated relationship graph. The updates 314 to the relationship graph can be generated by including the new weight of each edge in the relationship graph that has a non-zero aggregated weight change.

FIG. 5 illustrates an example of updating a relationship graph based on the chat user change records 312, according to certain aspects of the present disclosure. As discussed above, the chat communication group user information 502 can be used to generate a relationship graph 308 at time T−1. At time T, the chat user change records 504 for the past time period from T−1 to T are received. Based on the chat user change records 504, the relationship graph service 304 can determine user pair change records 508 which include user pair add records 510 and user pair delete records 512. A user pair add record indicates a pair of users in a chat group and that a connection should be added between the pair of users because at least one of the users joined the chat group. For example, because user $u_2$ joined the chat group $g_1$ (as indicated in the chat user change records 504), the user pair add records 510 includes records "g1 (u1, u2) 1" "g1 (u2, u3) 1" "g1 (u2, u4) 1" and "g1 (u2, u5) 1" indicating that a connection should be added between the new user $u_2$ and each of the other users in chat group $g_1$ including users $u_1$, $u_3$, $u_4$, and $u_5$.

Similarly, a user pair delete record indicates a pair of users in a chat group and that a connection should be deleted between the pair of users because at least one of the users left the chat group. For example, because user $u_6$ left the chat group $g_1$ (as indicated in the chat user change records 504), the user pair delete records 510 includes records "g1 (u1, u6)−1" "g1 (u3, u6)−1" and "g1 (u5, u6)−1" indicating that a connection should be deleted between user $u_6$ and each of the remaining users in chat group $g_1$ including users $u_1$, $u_3$, and $u_5$.

The user pair add records 510 and user pair delete records 512 can be aggregated across the chat communication groups to generate the aggregated user pair change records 514. Each of the aggregated user pair change records 514 indicates the pair of users whose connections (i.e., the weight of the corresponding edge) have changed due to the joining and leaving events occurred during the past time period as well as the change value. For example, the record "(u1, u2) 1" indicates that the total connections between users $u_1$ and $u_2$ should be increased by 1 whereas record "(u1, u3)−3" indicates that the total connections between users $u_1$ and $u_2$ should be decreased by 3. In some examples, the relationship graph service 304 detects and removes the duplicated records in the user pair add records 510 and user pair delete records 512 before the aggregation is performed.

The aggregated user pair change records 514 can be applied to the relationship graph 516 at time T−1 to generate the relationship graph 518 at time T. For example, based on the aggregated user pair change record "(u1, u2) 1," the relationship graph service 304 can increase the weight of the edge connecting nodes for users $u_1$ and $u_2$ by 1. As a result, the updated weight of the edge connecting nodes for users $u_1$ and $u_2$ becomes 6 as shown in the relationship graph 518. Likewise, the relationship graph service 304 can decrease the weight of the edge connecting nodes for users $u_1$ and $u_3$ by 3. As a result, the updated weight of the edge connecting nodes for users $u_1$ and $u_3$ becomes 0 which means the edge should be removed. As such, this edge is not shown in the relationship graph 518. As to the aggregated user pair change record "(u2, u4) 3," because the relationship graph 516 does not have an edge between the nodes for users $u_2$ and $u_4$, a new edge can be added in the relationship graph 518 between the nodes for users $u_2$ and $u_4$ with a weight 3. The edges in the updated relationship graph 518 that are different from the relationship graph 516 can be listed as the relationship graph updates 520.

In some implementations, the relationship graph service 304 further update the chat communication group user information 502 at the previous time T−1 by incorporating the chat user change records 504 to obtain the chat communication group user information 506 at time T. The chat communication group user information 506 at time T will be used to generate the relationship graph updates for the next time point T+1 in a way similar to the above process.

Referring back to FIG. 4, at block 430, the process 400 involves transmitting the relationship graph updates to the remoting computing device so that the remoting computing device can update the relationship graph locally based on the relationship graph updates. In the example of FIG. 5, the remote computing device can replace the edges in the existing relationship graph with those edges in the graph updates 520. If the new edge has a value 0, that edge can be removed from the relationship graph. If the relationship graph updates include an edge not in the existing relationship graph, a new edge can be added with the specified weight. In another implementation, the aggregated user pair change records (such as the aggregated user pair change records 514) can be used as the graph updates and transmitted to the remote computing device where the relationship graph 308 is updated as described above.

The relationship graph 308 can be used in various scenarios. In some examples, the relationships among the users as represented by the relationship graph 308 can be used to improve contact searches. For instance, the search results returned for a particular user searching for a co-worker within an organization can be ranked according to the weights of the edges connecting the particular user and the respective users in the search results. As a result, co-workers who are similar to the particular user are listed first in the search results allowing the user to find the result he/she wants accurately and quickly. In other examples, the relationships among the users as represented by the relationship graph 308 can be used to facilitate recommendations and personalization, for instance, in workspace suggestions. A user similar to the user who is performing the search according to the relationship graph 308 can be recommended to be assigned to the same workspace. This facilitates the communication between co-workers and workspace utilization. The relationship graph 308 can also be used in various other applications such as community detection, anomaly detection, identity resolution, user behavior profile generation, user preference prediction, etc.

It should be noted that while the above description focuses on using chat communication groups to build the relationship graph, other information can be used in addition to, or instead of, the chat communication groups. For example, email subscriptions of the users can be used to facilitate the building of the relationship graph. If two users subscribe to the same email list, the weight of the edge connecting the nodes of these two users can be increased by one. Other similar information can also be used.

Further, while the above description focuses on using a graph, any type of data structure can be used to represent the relationships among the users based on the chat communication groups joined by these users. For example, a table can be used with each row representing a pair of users and the corresponding weights (i.e., the number of common chat communication groups of the pair of users). Other types of data structures can also be used.

Figure 7:
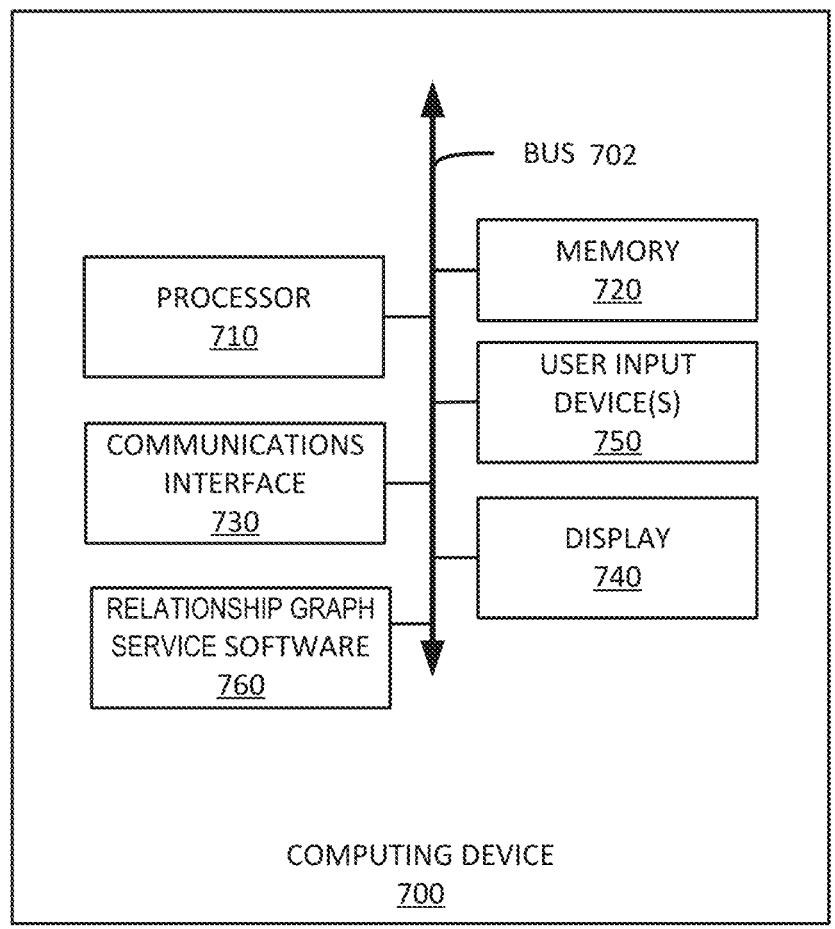
FIG. 7 shows an example computing device suitable for performing certain aspects of the present disclosure.

Referring now to FIG. 7, FIG. 7 shows an example computing device 700 suitable for performing certain aspects of the present disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more processes for expanding chat communication groups based on a chat context, such as part or all of the example process 400 described above with respect to FIG. 4. For example, the relationship graph service software 760 provided on the computing device 700 may provide instructions for performing one or more steps of the process 400 for building and updating a relationship graph based on online chat communication groups. The computing device, in this example, also includes one or more user input devices 750, such as a keyboard, mouse, touchscreen, video input device (e.g., one or more cameras), microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: a method performed by one or more computing devices, the method comprising: communicating with a chat and video conference provider to receive chat communication group user information, the chat and video conference provider configured to establish chat communication groups to exchange chat messages between client devices associated with users, the chat communication group user information for a chat communication group comprising user-group records each indicating a user and a chat communication group joined by the user; building a relationship graph for a plurality of chat communication groups based on the chat communication group user information for the plurality of the chat communication groups, nodes of the relationship graph representing respective users in the plurality of the chat communication groups, an edge connecting two nodes indicating that two users represented by the two nodes are in at least one common chat communication group, and a weight of the edge representing a number of common chat communication groups that the two users belong to; receiving chat user change records describing user changes occurred during a time period; generating relationship graph updates of the relationship graph based on the chat user change records; and transmitting the relationship graph updates to a remote computing device for use in updating the relationship graph at the remote computing device and identifying relationship among the users.

Example #2: the method of Example #1, wherein the chat user change records specify one or more of a user who joined a chat communication group or a user who left the chat communication group during the time period.

Example #3: The method of Examples #1-2, wherein generating updates to the relationship graph based on the chat group user change records comprises: determining a first set of pairs of users whose relationship is to be added to the relationship graph based on the users who joined the chat communication groups; and determining a second set of pairs of users whose relationship is to be removed from the relationship graph based on the users who left the chat communication groups.

Example #4: The method of Examples #1-3, wherein generating updates to the relationship graph based on the chat group user change records further comprises: removing duplicates in the first set of pairs of users or the second set of pairs of users; and aggregating the first set of pairs of users and the second set of pairs of users to generate a weight change for each pair of users in the first set of pairs of users and the second set of pairs of users.

Example #5: The method of Examples #1-4, wherein generating updates to the relationship graph based on the chat group user change records further comprises: applying the aggregated weight changes to the relationship graph at a previous time point to generate the relationship graph at a current time point; and generating the updates to the relationship graph by including an indication of a new weight of an edge in the relationship graph at the current time point, the edge having a non-zero aggregated weight changes.

Example #6: The method of Examples #1-5, wherein generating updates to the relationship graph based on the chat group user change records further comprises: including an indication of an aggregated weight change for each edge in the relationship graph that has a non-zero aggregated weight changes.

Example #7: The method of Examples #1-6, wherein the plurality of chat communication groups are private chat communication groups.

Example #8: A system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: communicate with a chat and video conference provider to receive chat communication group user information, the chat and video conference provider configured to establish chat communication groups to exchange chat messages between client devices associated with users, the chat communication group user information for a chat communication group comprising user-group records each indicating a user and a chat communication group joined by the user; build a relationship graph for a plurality of chat communication groups based on the chat communication group user information for the plurality of the chat communication groups, nodes of the relationship graph representing respective users in the plurality of the chat communication groups, an edge connecting two nodes indicating that two users represented by the two nodes are in at least one common chat communication group, and a weight of the edge representing a number of common chat communication groups that the two users belong to; receive chat user change records describing user changes occurred during a time period; generate relationship graph updates of the relationship graph based on the chat user change records; and transmit the relationship graph updates to a remote computing device for use in updating the relationship graph at the remote computing device and identifying relationship among the users.

Example #9: The system of Example #8, wherein the chat user change records specify one or more of a user who joined a chat communication group or a user who left the chat communication group during the time period.

Example #10: The system of Examples #8-9, wherein generating updates to the relationship graph based on the chat group user change records comprises: determining a first set of pairs of users whose relationship is to be added to the relationship graph based on the users who joined the chat communication groups; and determining a second set of pairs of users whose relationship is to be removed from the relationship graph based on the users who left the chat communication groups.

Example #11: The system of Examples #8-10, wherein generating updates to the relationship graph based on the chat group user change records further comprises: removing duplicates in the first set of pairs of users or the second set of pairs of users; and aggregating the first set of pairs of users and the second set of pairs of users to generate a weight change for each pair of users in the first set of pairs of users and the second set of pairs of users.

Example #12: The system of Examples #8-11, wherein generating updates to the relationship graph based on the chat group user change records further comprises: applying the aggregated weight changes to the relationship graph at a previous time point to generate the relationship graph at a current time point; and generating the updates to the relationship graph by including an indication of a new weight of an edge in the relationship graph at the current time point, the edge having a non-zero aggregated weight changes.

Example #13: The system of Examples #8-12, wherein generating updates to the relationship graph based on the chat group user change records further comprises: including an indication of an aggregated weight change for each edge in the relationship graph that has a non-zero aggregated weight changes.

Example #14: The system of Examples #8-13, wherein the plurality of chat communication groups are private chat communication groups.

Example #15: A non-transitory computer-readable medium comprising processor-executable instructions configured to cause one or more processors to: communicate with a chat and video conference provider to receive chat communication group user information, the chat and video conference provider configured to establish chat communication groups to exchange chat messages between client devices associated with users, the chat communication group user information for a chat communication group comprising user-group records each indicating a user and a chat communication group joined by the user; build a relationship graph for a plurality of chat communication groups based on the chat communication group user information for the plurality of the chat communication groups, nodes of the relationship graph representing respective users in the plurality of the chat communication groups, an edge connecting two nodes indicating that two users represented by the two nodes are in at least one common chat communication group, and a weight of the edge representing a number of common chat communication groups that the two users belong to; receive chat user change records describing user changes occurred during a time period; generate relationship graph updates of the relationship graph based on the chat user change records; and transmit the relationship graph updates to a remote computing device for use in updating the relationship graph at the remote computing device and identifying relationship among the users.

Example #16: The non-transitory computer-readable medium of Example #15, wherein the chat user change records specify one or more of a user who joined a chat communication group or a user who left the chat communication group during the time period.

Example #17: The non-transitory computer-readable medium of Examples #15-16, wherein generating updates to the relationship graph based on the chat group user change records comprises: determining a first set of pairs of users whose relationship is to be added to the relationship graph based on the users who joined the chat communication groups; and determining a second set of pairs of users whose relationship is to be removed from the relationship graph based on the users who left the chat communication groups.

Example #18: The non-transitory computer-readable medium of Examples #15-17, wherein generating updates to the relationship graph based on the chat group user change records further comprises: removing duplicates in the first set of pairs of users or the second set of pairs of users; and aggregating the first set of pairs of users and the second set of pairs of users to generate a weight change for each pair of users in the first set of pairs of users and the second set of pairs of users.

Example #19: The non-transitory computer-readable medium of Examples #15-18, wherein generating updates to the relationship graph based on the chat group user change records further comprises: applying the aggregated weight changes to the relationship graph at a previous time point to generate the relationship graph at a current time point; and generating the updates to the relationship graph by including an indication of a new weight of an edge in the relationship graph at the current time point, the edge having a non-zero aggregated weight changes.

Example #20: the non-transitory computer-readable medium of Examples #15-19, wherein generating updates to the relationship graph based on the chat group user change records further comprises: including an indication of an aggregated weight change for each edge in the relationship graph that has a non-zero aggregated weight changes.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method performed by one or more computing devices, the method comprising:

communicating with a chat and video conference provider to receive chat communication group user information, the chat and video conference provider configured to establish chat communication groups to exchange chat messages between client devices associated with users, the chat communication group user information for a chat communication group comprising user-group records each indicating a user and a chat communication group joined by the user;

building a relationship graph for a plurality of chat communication groups based on the chat communication group user information for the plurality of the chat communication groups, nodes of the relationship graph representing respective users in the plurality of the chat communication groups, an edge connecting two nodes indicating that two users represented by the two nodes are in at least one common chat communication group, and a weight of the edge representing a number of common chat communication groups that the two users belong to;

receiving chat user change records describing user changes occurred during a time period;

generating relationship graph updates of the relationship graph based on the chat user change records, generating the relationship graph updates comprising:

determining a first set of pairs of users whose relationship is to be added to the relationship graph based on a user who joined the plurality of the chat communication groups, and determining a second set of pairs of users whose relationship is to be removed from the relationship graph based on a user who left the plurality of the chat communication groups; and transmitting the relationship graph updates to a remote computing device for use in updating the relationship graph at the remote computing device and identifying relationship among the users.

2. The method of claim 1, wherein the chat user change records specify the user who joined the plurality of the chat communication groups and the user who left the plurality of the chat communication groups during the time period.

3. The method of claim 1, wherein generating updates to the relationship graph based on the chat group user change records further comprises:
removing duplicates in the first set of pairs of users or the second set of pairs of users; and
aggregating the first set of pairs of users and the second set of pairs of users to generate a weight change for each pair of users in the first set of pairs of users and the second set of pairs of users.

4. The method of claim 3, wherein generating updates to the relationship graph based on the chat group user change records further comprises:
applying the aggregated weight changes to the relationship graph at a previous time point to generate the relationship graph at a current time point; and
generating the updates to the relationship graph by including an indication of a new weight of an edge in the relationship graph at the current time point, the edge having a non-zero aggregated weight changes.

5. The method of claim 3, wherein generating updates to the relationship graph based on the chat group user change records further comprises:
including an indication of an aggregated weight change for each edge in the relationship graph that has a non-zero aggregated weight changes.

6. The method of claim 1, wherein the plurality of chat communication groups are private chat communication groups.

7. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
communicate with a chat and video conference provider to receive chat communication group user information, the chat and video conference provider configured to establish chat communication groups to exchange chat messages between client devices associated with users, the chat communication group user information for a chat communication group comprising user-group records each indicating a user and a chat communication group joined by the user;
build a relationship graph for a plurality of chat communication groups based on the chat communication group user information for the plurality of the chat communication groups, nodes of the relationship graph representing respective users in the plurality of the chat communication groups, an edge connecting two nodes indicating that two users represented by the two nodes are in at least one common chat communication group, and a weight of the edge representing a number of common chat communication groups that the two users belong to;
receive chat user change records describing user changes occurred during a time period;
generate relationship graph updates of the relationship graph based on the chat user change records, generating the relationship graph updates comprising:
determining a first set of pairs of users whose relationship is to be added to the relationship graph based on a user who joined the plurality of the chat communication groups, and
determining a second set of pairs of users whose relationship is to be removed from the relationship graph based on a user who left the plurality of the chat communication groups; and
transmit the relationship graph updates to a remote computing device for use in updating the relationship graph at the remote computing device and identifying relationship among the users.

8. The system of claim 7, wherein the chat user change records specify the user who joined the plurality of the chat communication groups and the user who left the plurality of the chat communication groups during the time period.

9. The system of claim 7, wherein generating updates to the relationship graph based on the chat group user change records further comprises:
removing duplicates in the first set of pairs of users or the second set of pairs of users; and
aggregating the first set of pairs of users and the second set of pairs of users to generate a weight change for each pair of users in the first set of pairs of users and the second set of pairs of users.

10. The system of claim 9, wherein generating updates to the relationship graph based on the chat group user change records further comprises:
applying the aggregated weight changes to the relationship graph at a previous time point to generate the relationship graph at a current time point; and
generating the updates to the relationship graph by including an indication of a new weight of an edge in the relationship graph at the current time point, the edge having a non-zero aggregated weight changes.

11. The system of claim 9, wherein generating updates to the relationship graph based on the chat group user change records further comprises:
including an indication of an aggregated weight change for each edge in the relationship graph that has a non-zero aggregated weight changes.

12. The system of claim 7, wherein the plurality of chat communication groups are private chat communication groups.

13. A non-transitory computer-readable medium comprising processor-executable instructions configured to cause one or more processors to:
communicate with a chat and video conference provider to receive chat communication group user information, the chat and video conference provider configured to establish chat communication groups to exchange chat messages between client devices associated with users, the chat communication group user information for a chat communication group comprising user-group records each indicating a user and a chat communication group joined by the user;
build a relationship graph for a plurality of chat communication groups based on the chat communication group user information for the plurality of the chat communication groups, nodes of the relationship graph representing respective users in the plurality of the chat communication groups, an edge connecting two nodes indicating that two users represented by the two nodes are in at least one common chat communication group, and a weight of the edge representing a number of common chat communication groups that the two users belong to;

receive chat user change records describing user changes occurred during a time period;

generate relationship graph updates of the relationship graph based on the chat user change records, generating the relationship graph updates comprising:

determining a first set of pairs of users whose relationship is to be added to the relationship graph based on a user who joined the plurality of the chat communication groups, and determining a second set of pairs of users whose relationship is to be removed from the relationship graph based on a user who left the plurality of the chat communication groups; and transmit the relationship graph updates to a remote computing device for use in updating the relationship graph at the remote computing device and identifying relationship among the users.

14. The non-transitory computer-readable medium of claim 13, wherein the chat user change records specify the user who joined the plurality of the chat communication groups and the user who left the plurality of the chat communication groups during the time period.

15. The non-transitory computer-readable medium of claim 13, wherein generating updates to the relationship graph based on the chat group user change records further comprises:

removing duplicates in the first set of pairs of users or the second set of pairs of users; and aggregating the first set of pairs of users and the second set of pairs of users to generate a weight change for each pair of users in the first set of pairs of users and the second set of pairs of users.

16. The non-transitory computer-readable medium of claim 15, wherein generating updates to the relationship graph based on the chat group user change records further comprises:

applying the aggregated weight changes to the relationship graph at a previous time point to generate the relationship graph at a current time point; and generating the updates to the relationship graph by including an indication of a new weight of an edge in the relationship graph at the current time point, the edge having a non-zero aggregated weight changes.

17. The non-transitory computer-readable medium of claim 15, wherein generating updates to the relationship graph based on the chat group user change records further comprises:

including an indication of an aggregated weight change for each edge in the relationship graph that has a non-zero aggregated weight changes.

* * * * *